United States Patent [19]
Krueger et al.

[11] Patent Number: 5,622,323
[45] Date of Patent: Apr. 22, 1997

[54] HAY PROCESSING SYSTEM FOR A MIXER FEEDER

[75] Inventors: Kurt A. Krueger, Mayville; Fred G. Kuhn, West Bend, both of Wis.

[73] Assignee: Gehl Company, West Bend, Wis.

[21] Appl. No.: 513,319

[22] Filed: Aug. 10, 1995

[51] Int. Cl.⁶ .......................... B02C 19/22; B02C 21/02
[52] U.S. Cl. .................. 241/101.76; 241/260.1; 241/605
[58] Field of Search .......................... 241/101.76, 260.1, 241/605

[56] References Cited

U.S. PATENT DOCUMENTS

| | | | |
|---|---|---|---|
| 2,978,097 | 4/1961 | Blanshine | 241/260.1 X |
| 3,915,392 | 10/1975 | Kugler | 241/74 |
| 3,979,074 | 9/1976 | White et al. | 241/30 |
| 3,995,836 | 12/1976 | Carter et al. | 259/6 |
| 4,083,501 | 4/1978 | Ryan | 241/101 |
| 4,310,252 | 1/1982 | Ryan | 366/186 |
| 4,506,990 | 3/1985 | Neier et al. | 366/299 |
| 4,522,296 | 6/1985 | Rieke | 241/260.1 X |
| 4,741,625 | 5/1988 | Neier | 366/196 |
| 4,951,883 | 8/1990 | Loppoli et al. | 241/605 X |
| 5,356,054 | 10/1994 | Loppoli et al. | 241/101.76 X |
| 5,439,182 | 8/1995 | Sgariboldi | 241/260.1 |
| 5,443,588 | 8/1995 | Loppoli | 241/260.1 X |

OTHER PUBLICATIONS

"Total Mix" TMR Mixer Feeders, Form No. 4857 Jan. 1995–20M, Gehl Company 1995.
"Farm Aid Mixer", Farm Aid Mfg. Co. (no date given).

*Primary Examiner*—John M. Husar
*Attorney, Agent, or Firm*—Andrus, Sceales, Starke & Sawall

[57] ABSTRACT

A mixing and feeding apparatus is provided for processing long-stemmed and livestock feed material. The apparatus comprises a receptacle having upright front and rear walls and side walls defining a mixing chamber for blending the feed material. One of the side walls has a discharge door which is generally aligned with the mid portion of the mixing chamber. The receptacle also has a scalloped bottom wall defining a pair of side-by-side troughs, each of the troughs having an inwardly projecting hay bar located on an upper end of the trough. An auger arrangement is disposed in the receptacle to blend the feed material in the mixing chamber. The auger arrangement includes first and second lower augers located in the bottom portion with one of the lower augers in each of the troughs. The auger arrangement further includes third and fourth upper augers positioned above and generally parallel to the first and second lower augers. Each of the first, second, third, and fourth augers comprise longitudinal shafts provided with segments of spiral flighting to move the feed material from the front and rear walls to the mid portion of the mixing chamber. A combined knife and paddle arrangement is mounted on the longitudinal shafts of the first and second lower augers and located between adjacent segments of the spiral flighting in the mid portion of the mixing chamber.

27 Claims, 3 Drawing Sheets

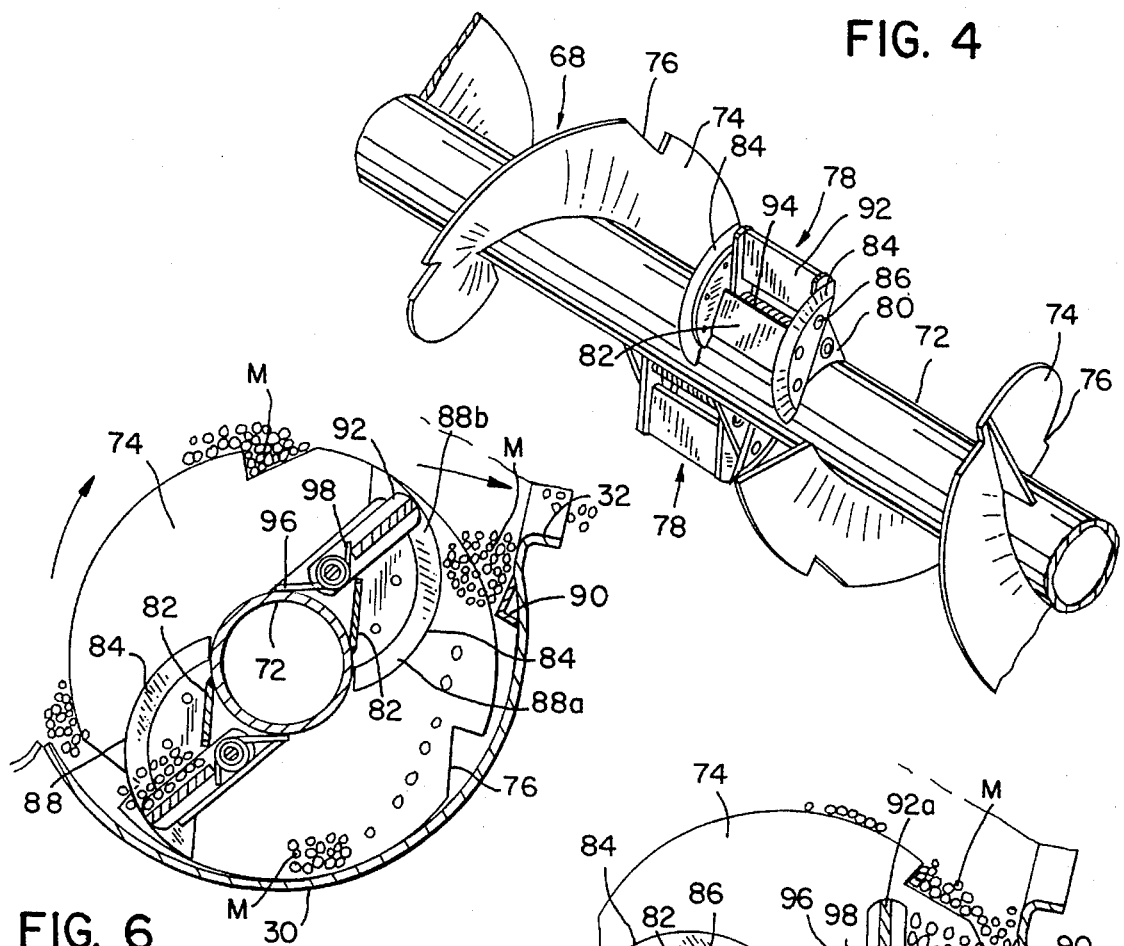
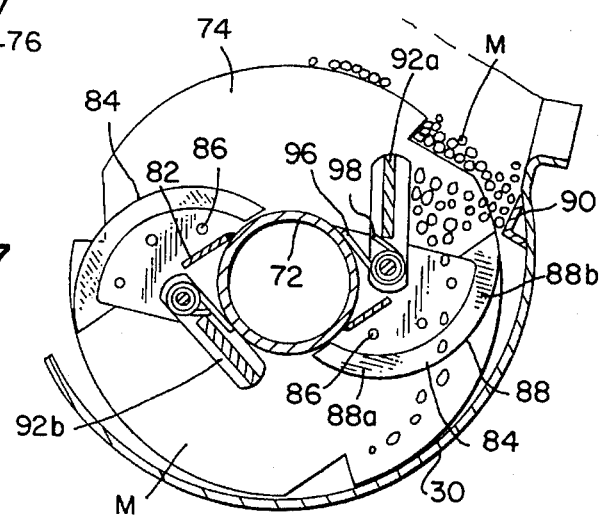
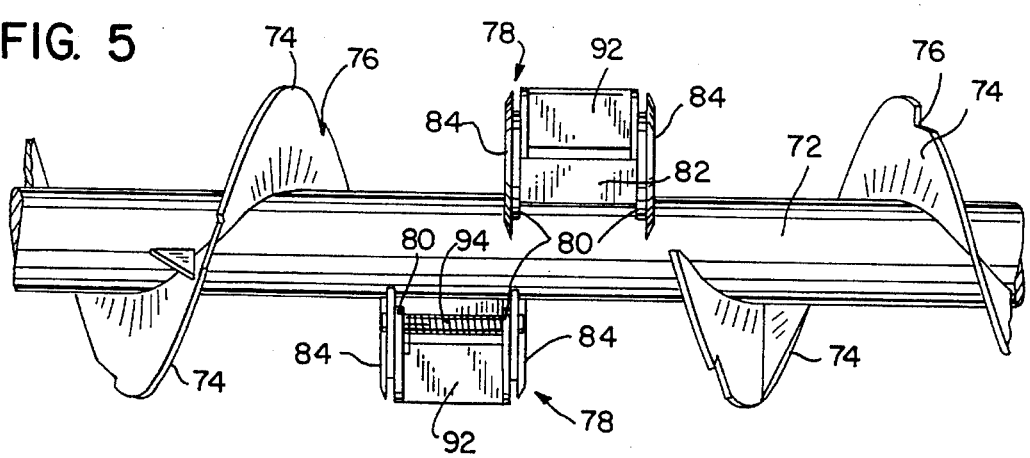

HAY PROCESSING SYSTEM FOR A MIXER FEEDER

FIELD OF THE INVENTION

This invention relates generally to the field of mixing and feeding equipment and, more particularly, pertains to livestock mixer feeders equipped with hay handling/processing capability.

BACKGROUND OF THE INVENTION

It has become common practice in livestock feeding to blend the ingredients of the feed in a box mixer, either stationary or mobile. The typical box mixer contains augers, paddle blades and other types of mixing components which are intended to operate on the ingredients of the feed to blend them into a substantially homogeneous mass and on demand to assist in conveying and discharging the feed from the box so that all animals fed from the batch in the mixer will be provided a substantially uniform ration content.

Achieving uniformity of distribution of all the ingredients of the mix throughout the feed mass is difficult. In particular, the handling of roughage, which is normally of a stringy, fibrous nature, provides problems in both mixing and conveying. Not only must the stringy roughage be blended uniformly into the feed, but it also must be effectively conveyed through the box and out through the discharge as part of an essentially continuous mass in which the uniformity of blend is maintained.

Prior art mixer feeders employed an auger mounted, fixed center blade which tends to wedge long-stemmed material between the box wall and the trough in which the auger operates. The hay processed with this prior art arrangement has a tendency to wind around or "hairpin" the fixed blade, to choke or jam up the discharge outlet, and has a further tendency to move erratically with the result that a regulated feed of material to create a pile of desired dimension is difficult to achieve.

Such predecessor mixer feeders have not proved effective and convenient to use and it remains desirable to provide a material mixing and feeding apparatus operable to continuously blend and mix all feed ingredients into the most homogeneous ration possible. It is also desirable to provide a mixer and feeder apparatus which will yield a faster, more efficient mixing action with a wide variety of feed materials, especially bales of long-stemmed hay.

SUMMARY OF THE INVENTION

The present invention advantageously provides a mixing and feeding apparatus particularly adapted to produce a high uniformity of mixing in a reasonable time and which is easy to load and unload. Such apparatus is adapted to handle different types of feed material having various physical characteristics such as weight, size, cohesiveness, moisture and the like to produce a substantially homogeneous mix ready for animal consumption.

These and other aspects of the invention are realized in a mixing and feeding apparatus for processing long-stemmed material within a walled receptacle defining a mixing chamber provided with at least one pair of counterrotating augers. Each of the augers has a mid portion joining a front portion and a rear portion and has a longitudinal shaft carrying segments of spiral flighting adjacent one another. At least one pair of fixed, parallel, spaced cutting blades are eccentrically mounted on the shaft and located between the adjacent segments of the spiral flighting in the mid portion of the auger. Each of the cutting blades has an arcuate cutting surface which extends from the periphery of the shaft to the periphery of the flighting for slicing the long-stemmed material against a wall of the mixing chamber.

Another aspect of the invention resides in a mixing and feeding apparatus for processing long-stemmed material within a walled receptacle defining a mixing chamber provided with at least one pair of counterrotating augers and a movable discharge door adapted to remain closed during a mixing mode and to be opened during an unloading mode. Each of the augers has a mid portion joining a front portion and a rear portion and each of the augers further has a longitudinal shaft carrying segments of spiral flighting adjacent one another. At least one deflectable, biased paddle is mounted for pivotal movement about an axis offset from and parallel to the longitudinal axis of the shaft. The paddle is movable between a normally upright position and a folded-back position during the mixing mode in which the long-stemmed material is processed and returnable to the upright position during the unloading mode in which the biased paddle acts to sweep the processed long-stemmed material out the discharge door.

Another aspect of the invention resides in a mixing and feeding apparatus for processing long-stemmed and livestock feed material. A receptacle has upright front and rear walls and side walls defining a mixing chamber for blending the feed material. One of the side walls has a discharge door generally aligned with the mid portion of the mixing chamber. The receptacle also has a scalloped bottom wall defining a pair of side-by-side troughs, each of said troughs having an inwardly projecting hay bar located on an upper end of the trough. An auger arrangement is disposed in the receptacle to blend the feed material in the mixing chamber. The auger arrangement includes first and second lower augers located in the bottom portion with one of the lower augers in each of the troughs. The auger arrangement further includes third and fourth upper augers positioned above and generally parallel to the first and second lower augers. Each of the first, second, third, and fourth augers comprise longitudinal shafts provided with segments of spiral flighting to move the feed material from the front and rear walls to the mid portion of the mixing chamber. A combined knife and paddle arrangement is mounted on the longitudinal shafts of the first and second lower augers and located between adjacent segments of the spiral flighting in the mid portion of the mixing chamber. The hay bars provide a cutting surface for assisting the knives of the knife and paddle arrangement in slicing long-stemmed material, such as hay, upon rotation of the lower augers.

BRIEF DESCRIPTION OF THE DRAWINGS

The invention will become better understood by reference to the following detailed description of the preferred exemplary embodiment when read in conjunction with the appended drawing wherein numerals denote like elements.

FIG. 3 is a cross-sectional view taken along line 3—3 of FIG. 2;

FIG. 4 is a perspective view of a portion of one of the augers, showing the knife and paddle assembly of the hay cutting and handling arrangement;

FIG. 5 is a front elevational view of the portion of the auger shown in FIG. 4;

FIG. 6 is an enlarged, cross-sectional view depicting the knife and paddle assembly in an unloading mode; and FIG. 7 is an enlarged, cross-sectional view depicting the knife and paddle assembly in a mixing mode.

DETAILED DESCRIPTION OF THE PREFERRED EMBODIMENT

Figure 1:
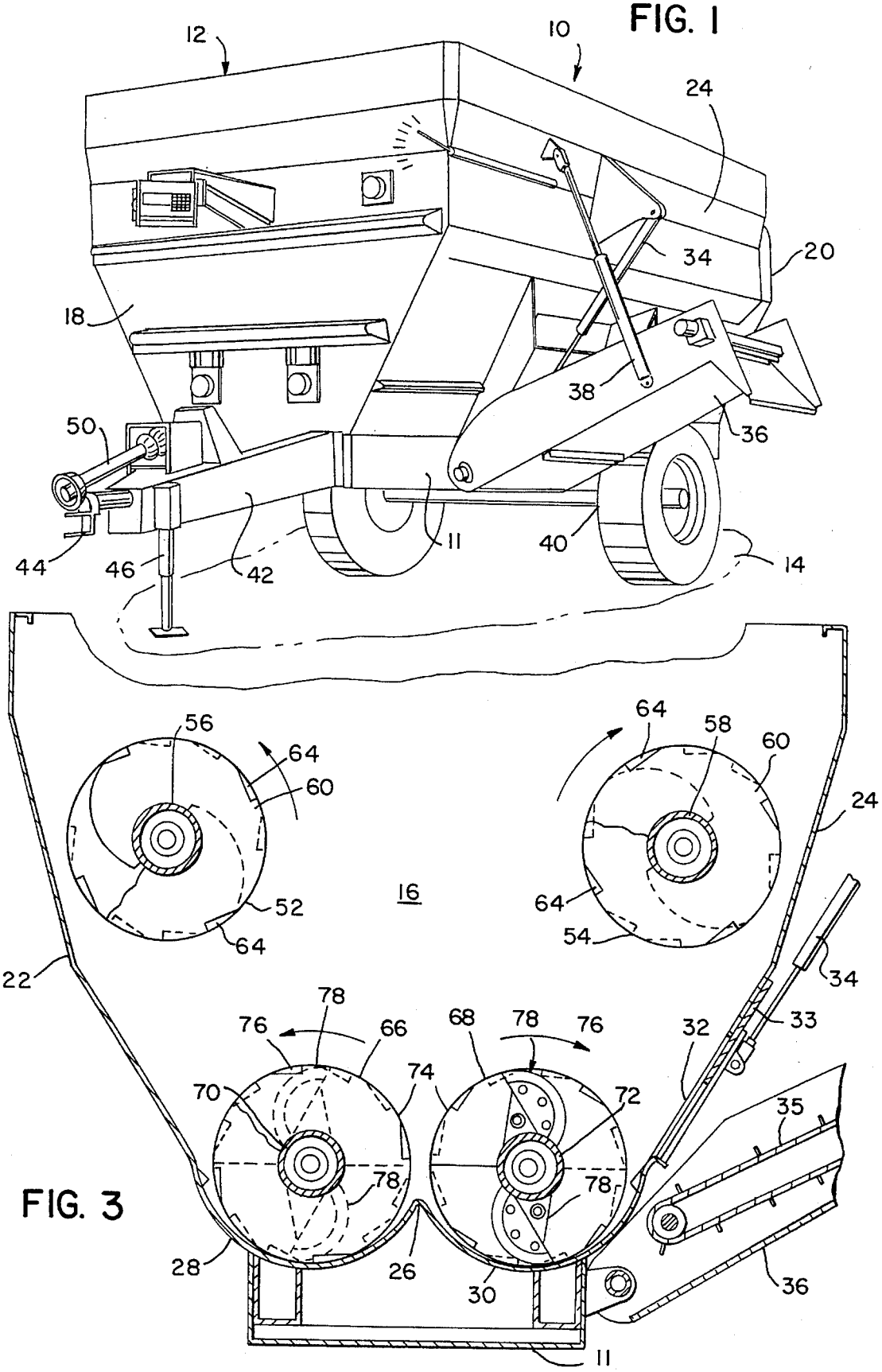
FIG. 1 is a perspective view of a mixer feeder equipped with a hay cutting and handling arrangement embodying the present invention.
Figure 2:
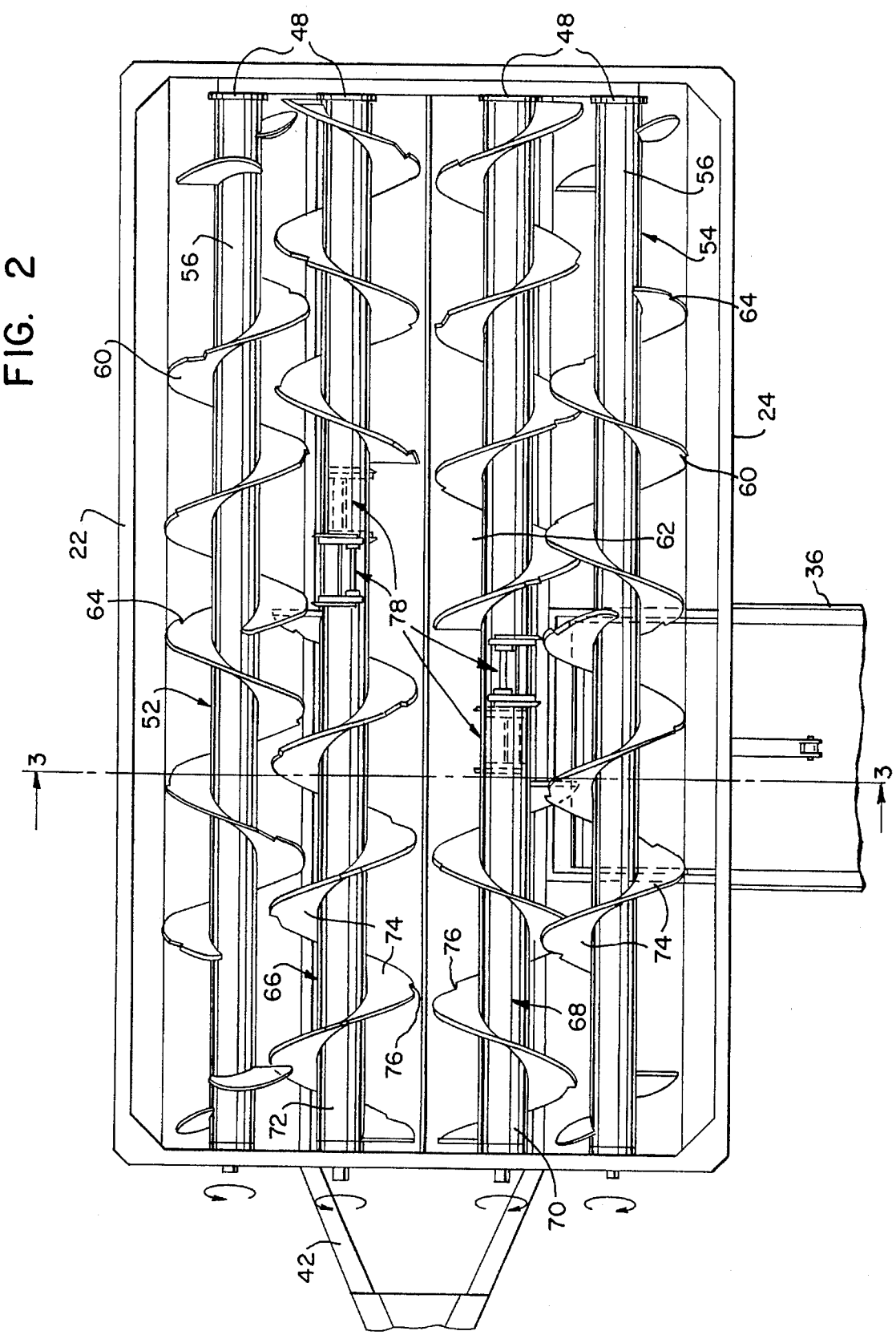
FIG. 2 is a top plan view of the mixer feeder of FIG. 1.

Referring to FIGS. 1–3, there is shown the mixing and feeding apparatus 10 of the invention in the form of a wagon or trailer 12 supported on a surface, such as the ground 14. Apparatus 10 is operable to receive various materials such as grain, silage, hay, and other feed materials, and transport these materials to a discharge or feeding location. The materials are mixed in the apparatus 10 so that a number of ingredients can be thoroughly mixed with each other and fine and coarse matter is evenly dispersed with each other providing a generally uniform mixture of materials. The following description is limited to an apparatus for mixing animal feed materials, especially those of the long-stemmed type. It is apparent that other types of agricultural and non-agricultural materials and granular materials can be mixed, transported and discharged by the apparatus.

Apparatus 10 has a base frame 11 which supports an open top receptacle indicated generally at 12 having a mixing chamber or compartment 16 for accommodating various materials such as grains, silage, hay and the like. Receptacle 12 includes upright front and rear walls 18, 20, side walls 22, 24 and a scalloped bottom wall 26 defining a pair of side-by-side troughs 28, 30. One of the side walls 24 is provided with a discharge opening 32, associated with a door 33, the opening and closing of which is controlled by a hydraulic cylinder 34. Processed material is selectively discharged through the opening 32 onto a conveyor 35 located in a chute 36 pivoted to the base frame 11 and raised and lowered by a hydraulic cylinder 38. Front and rear walls 18, 20, side walls 22, 24, and the bottom wall 26 are secured to the base frame 11 having a wheel and axle assembly 40 at the rear end and a forwardly directed tongue 42 at the front end. The tongue 42 is provided with a conventional hitching arrangement 44 for coupling the apparatus 10 to a tractor or other pulling vehicle (not shown). The tongue 42 is also provided with a standard jackstand 46 for supporting the apparatus 10 when it is disconnected from the tractor. A material moving and mixing means in the form of a rotary auger arrangement 48 (FIG. 2) is longitudinally disposed in the mixing chamber 16 and is operable to move the material in a continuous mixing pattern so that materials of various sizes, densities, and kinds will be thoroughly mixed and blended with each other. Power for driving the auger arrangement is derived from a power takeoff shaft 50 connected to the tractor.

Turning now to FIGS. 2 and 3, the auger arrangement 48 comprises a pair of parallel, spaced upper augers 52, 54 extending between the front wall 18 and the rear wall 20 adjacent the side walls 22, 24. Each upper auger 52, 54 has a longitudinal shaft 56, 58 to which a plurality of segmented spiral flighting 60 is attached. The flighting 60 provides a series of reversed spirals or twists whereby they convey material from a mid portion 62 of the mixing chamber 16 toward the end walls 18, 20. As is well known, the periphery of the flighting 60 is interrupted by notches 64 which grab and pull hay in the desired direction. Upper auger 52 is rotated counter-clockwise while upper auger 54 is rotated clockwise to move material toward the end walls 18, 20 of the mixing chamber 16 and towards the side walls 22, 24.

The auger arrangement 48 further includes a pair of parallel, spaced lower augers 66, 68 extending between the front wall 18, 20 and the rear wall. Lower augers 66, 68 are located below, inwardly of and parallel to upper augers 52, 54. Each lower auger 66, 68 has a longitudinal shaft 70, 72 to which a plurality of segmented spiral flighting 74 with notches 76 is attached. In addition, each of the lower augers 66, 68 is disposed for rotation in one of the troughs 28, 30 formed in the bottom wall 26. Lower auger 66 is rotated counter-clockwise while lower auger 68 is rotated clockwise to advance the material into the mid portion 62 of mixing chamber 16 and toward side walls 22, 24. In the case of the lower auger 68, the material is moved towards the discharge opening 32 formed in side wall 24.

As a salient feature of the invention, best depicted in FIGS. 4–7, a combination knife and paddle arrangement 78 is mounted 180° apart on the upper and lower portions of the longitudinal shafts 70, 72 of both lower augers 66, 68 and is located between adjacent segments of spiral flighting 74 in the mid portion 62 of the mixing chamber 16. For purposes of simplicity, FIGS. 4–7 depict the structure described below as it relates to lower auger 68. However, it should be understood that these figures also portray the identical structure of lower auger 66.

The combined knife and paddle arrangement 78 preferably comprises four identically designed hay cutting and handling assemblies. Each of the assemblies includes a pair of spaced, upright brackets 80 welded or otherwise affixed about the periphery of longitudinal shaft 70 or 72 at a point midway between adjacent segments of spiral flighting 74. A reinforcement plate 82 is connected between each of the brackets 80 to create a solid mounting structure for a pair of arcuate, reversible cutting knives or blades 84, each of which is secured by removable fasteners 86 to an outside surface of a respective one of the brackets 80. The effective length of each blade 84 is substantially equal to the radius of the spiral flighting 74. Brackets 80 enable the blades 84 to be eccentrically mounted with respect to longitudinal shaft 70, 72. Each blade 84 has an arcuate cutting surface 88 extending from the periphery of the shaft 70, 72 to the periphery of the flighting 74. As will be appreciated hereafter, each of the cutting blades 84 is adapted to cut long-stemmed material against a hay bar 90 projecting inwardly from the upper, outer wall of each trough 28, 30.

Each of the assemblies further includes a flat, deflectable paddle 92 pivotally mounted along an axis offset from and substantially parallel to the longitudinal axis of the respective longitudinal shaft 70, 72. The paddle 92 is normally biased to an upright position limited by reinforcement plate 82 shown in FIGS. 4–6 by means of a horizontally disposed coil spring 94 having a first leg 96 disposed against the periphery of shaft 70, 72 and a second leg 98 disposed against the bottom of the paddle 92. The paddle 92 is designed to provide relief from long-stemmed material being processed and fed into areas between the augers 66, 68 and troughs 28, 30 where jamming and wedging may occur. Each paddle 92 can thus be deflected to a partially or totally folded-back position according to the degree of processed material in the vicinity of the paddle 92.

In use, material loading machines having buckets and the like are employed to pick up material such as silage, grain and bales of long-stemmed hay, and dump the material into the mixing chamber 16 of the open top receptacle 12. Upper and lower augers 52, 54, 66, 68 are rotated by a drive assembly (not shown) connected to the tractor-driven power takeoff shaft 50. The rotating augers 52, 54, 66, 68 move the material to be processed in a continuous flow and mixing motion similar to a figure eight pattern.

According to the invention, long-stemmed material M introduced into the receptacle 12 is advanced by the augers 52, 54, 66, 68 toward the mid portion 62 of mixing chamber 16 and toward side walls 22, 24. During this mixing mode (FIG. 7), the notches 64 on the peripheries of the augers 52, 54, 66, 68 pull or grab certain amounts of the long-stemmed material M to break up bales or clusters of material M for mixing it with other feed ingredients in chamber 16. Continued rotation of the augers 66, 68 causes the arcuate blades 84 to slice or cut the long-stemmed material M against the hay bars 90. One should appreciate the arcuate shape of the blades 84 which utilize a leading edge 88a to initially cut material M adjacent the hay bar 90 and simultaneously push the remaining material M against the hay bar 90 so that a trailing edge 88b can perform a greater portion of the slicing or cutting. The present invention substantially avoids the long-stemmed material wrapping or "hairpinning" around the blades due to the rolling and pushing motion of arcuate blades 84 along with the location of the blades 84 relative to the auger flighting 74. It should be further appreciated that the mounting and arcuate shape of the blades 84 allows the blades 84 to be easily reversed or replaced simply by removing the fasteners 86, repositioning the blades 84, and reinstalling the fasteners 86.

To further avoid wedging and jamming, the cut material M pushes against the spring-biased paddle 92 and is allowed to flow freely between the blades 84. FIG. 7 illustrates an example where one of the paddles 92a is partially folded-back and the other of the paddles 92b is fully folded-back due to the amount of cut material M in the vicinities of the paddles 92. In the unloading mode of FIG. 6, hydraulic cylinder 94 (FIG. 1) is used to open door 34 and access discharge opening 32. The processed material M which causes the paddles 92 to fold back is directed to the discharge opening 32, its exit being assisted by the paddles 92 assuming their normal upright position and thereby sweeping out the feed material M from the augers 66, 68 as depicted in FIG. 6. The processed material M is then discharged from the opening 32 with the use of conveyor 35 to a desired location such as an animal feed bunk. It should be appreciated that the four arcuate, dual knife and spring-biased paddle assemblies 78 effectively break up long-stemmed hay material M for a quicker mix with less chance of wrapping or jamming. It should be further understood that the apparatus will continuously blend and mix material into a homogeneous mixture and discharge the mixture to a desired location.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A mixing and feeding apparatus for processing long-stemmed material within a walled receptacle defining a mixing chamber provided with at least one auger, each auger having a longitudinal shaft carrying spiral flighting, the apparatus comprising:

a fixed cutting blade eccentrically mounted on said shaft and having an arcuate cutting surface extending outwardly from a location directly adjacent the periphery of said shaft for slicing the long-stemmed material during rotation of the auger.

2. The apparatus of claim 1, including at least one pair of counterrotating augers, each of said augers having a mid portion joining a front portion and a rear portion and each of said augers having said longitudinal shaft carrying segments of said spiral flighting adjacent one another.

3. The apparatus of claim 2, including at least one pair of parallel, spaced cutting blades, each of said cutting blades being eccentrically mounted on said shaft and located between said adjacent segments of said spiral flighting in said mid portion of said auger.

4. The apparatus of claim 3, including another pair of fixed, parallel, spaced cutting blades eccentrically mounted on said shaft and located opposite said one pair of fixed, parallel, spaced cutting blades and between said adjacent segments of said spiral flighting in said mid portion of said auger.

5. The apparatus of claim 1, including a hay bar projecting inwardly from a wall of said mixing chamber, said cutting blade being engageable with said hay bar upon rotation of said auger.

6. A mixing and feeding apparatus for processing long-stemmed material within a walled receptacle defining a mixing chamber provided with at least one pair of counter-rotating augers and a movable discharge door adapted to remain closed during a mixing mode and to be opened during an unloading mode, each of said augers having a mid portion between a front portion and a rear portion, and each of said augers further having a longitudinal shaft carrying segments of spiral flighting adjacent one another, the apparatus comprising:

at least one deflectable resiliently biased paddle located between adjacent segments of said spiral flighting in said mid portion of said auger and in lateral alignment with said discharge door, and mounted on said shaft for pivotal movement about an axis offset from the longitudinal axis of said shaft, said paddle being movable between a normally resiliently biased, upright position and a forced, folded-back position during the mixing mode in which the long-stemmed material is processed and returnable to the upright position during the unloading mode in which said resiliently biased paddle acts to sweep the processed long-stemmed material out of the discharge door.

7. The apparatus of claim 6, including a pair of spaced, upright brackets fixed to said shaft, said paddle being mounted between said brackets.

8. The apparatus of claim 7, including a coil torsion spring horizontally disposed between said brackets.

9. The apparatus of claim 8, said spring having a first leg disposed against the periphery of said shaft and a second leg disposed against the bottom of said paddle.

10. A mixing and feeding apparatus for processing long-stemmed and livestock feed material, the apparatus comprising:

a receptacle having upright front and rear walls and side walls defining a mixing chamber for blending the feed material, one of said side walls having a discharge door generally aligned with a mid portion of said mixing chamber, said receptacle also having a scalloped bottom wall defining a pair of side-by-side troughs;

an auger arrangement disposed in said receptacle to blend the feed material in the mixing chamber, said auger arrangement including first and second lower augers having longitudinal shafts located in said bottom wall, one of said lower augers in each of said troughs; and a combined knife and resiliently biased paddle arrangement mounted on said longitudinal shafts of said first and second lower augers in said mid portion of said mixing chamber.

11. The apparatus of claim 10, wherein said first and second lower augers are counterrotatable.

12. The apparatus of claim 10, wherein said auger arrangement comprises third and fourth augers which are located above and generally parallel to said lower augers, and which are counterrotatable.

13. The apparatus of claim 12, wherin said first and third augers are driven in a counter-clockwise direction and second and fourth augers are driven in a clockwise direction.

14. The apparatus of claim 10, wherein the periphery of said flighting is formed with notches constructed and arranged to pull and tear long-stemmed feed material.

15. The apparatus of claim 14, wherein said combined knife and paddle arrangement includes a pivotable paddle located between said pair of cutting blades.

16. The apparatus of claim 10, wherein said combined knife and paddle arrangement comprises a pair of spaced, upright brackets fixed about the periphery of said longitudinal shaft and a pair of cutting blades, each of said blades being fixed to a respective one of said brackets.

17. The apparatus of claim 16, wherein the effective length of said cutting blades is equal to the radius of said spiral flighting.

18. The apparatus of claim 16, wherein said cutting blades are arcuate.

19. The apparatus of claim 10, wherein said combined knife and paddle arrangement comprises a flat, spring-biased paddle pivotally mounted on said shaft along an axis offset with and substantially parallel to the longitudinal axis of said longitudinal shaft.

20. The apparatus of claim 19, wherein said spring-biased paddle is movable from an upright position for assisting in the discharge of the feed material to a folded-back position for allowing unrestricted movement of the feed material in the blending thereof.

21. In a mixing and feeding apparatus for processing long-stemmed material within a walled receptacle defining a mixing chamber provided with at least one rotatable auger, said auger having a longitudinal shaft carrying spiral flighting and defining a pair of spaced ends, the improvement comprising:

a portion of said auger between said spaced ends being constructed free of said flighting; and a pair of knife assemblies, each of said knife assemblies being radially offset with respect to the other and mounted on said shaft in said auger portion free of said flighting.

22. The improvement of claim 21, wherein each of said knife assemblies is axially offset with respect to the other.

23. The improvement of claim 21, wherein each of said knife assemblies has a pair of axially offset knives.

24. The improvement of claim 23, wherein each of said knives are alignable with and parallel to each other.

25. The improvement of claim 23, including a paddle pivotably mounted between said pair of knives.

26. The improvement of claim 25, wherein said paddle is spring-biased between a normally biased upright position and a forced, folded-back position during which the long-stemmed material is processed.

27. A mixing and feeding apparatus for processing long-stemmed material within a walled receptacle defining a mixing chamber provided with at least one auger, each auger having a longitudinal shaft carrying spiral flighting, the apparatus comprising:

a fixed cutting blade eccentrically mounted on said shaft and having an arcuate, substantially semi-circular cutting surface extending from the periphery of said shaft to the periphery of said flighting for slicing the long-stemmed material.

* * * * *